United States Patent
Fujiwara et al.

(10) Patent No.: US 6,705,444 B2
(45) Date of Patent: Mar. 16, 2004

(54) ONE-WAY CLUTCH UNIT

(75) Inventors: Hideki Fujiwara, Nara-ken (JP); Taku Adaniya, Aichi-ken (JP); Masahiro Kawaguchi, Kariya (JP); Masaki Ota, Kariya (JP)

(73) Assignees: Koyo Seiko Co., Ltd., Osaka (JP); Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 10/193,227

(22) Filed: Jul. 12, 2002

(65) Prior Publication Data

US 2003/0010591 A1 Jan. 16, 2003

(30) Foreign Application Priority Data

Jul. 13, 2001 (JP) ........................................ 2001-213644

(51) Int. Cl.$^7$ .............................................. F16D 41/07
(52) U.S. Cl. ..................................... 192/45; 192/110 B
(58) Field of Search ............................... 192/45, 110 B, 192/112, 41 R; 384/495

(56) References Cited

U.S. PATENT DOCUMENTS

| | | | | |
|---|---|---|---|---|
| 3,623,581 | A | * 11/1971 | Livezey | ........................ 192/45 |
| 5,074,393 | A | 12/1991 | Itomi | |
| 5,078,243 | A | 1/1992 | Kanai et al. | |
| 5,343,991 | A | * 9/1994 | Premiski et al. | ............... 192/45 |
| 5,433,305 | A | * 7/1995 | Takamatsu et al. | ........... 192/45 |
| 5,601,166 | A | * 2/1997 | Beppu et al. | .................. 192/45 |
| 6,279,708 | B1 | 8/2001 | Yatabe et al. | |

FOREIGN PATENT DOCUMENTS

| | | |
|---|---|---|
| DE | 44 21 161 A1 | 12/1995 |
| DE | 195 31 745 A1 | 3/1996 |
| DE | 199 20 508 A1 | 11/2000 |
| JP | 63-275820 A * | 11/1988 |
| JP | 2-309021 A | 12/1990 |
| JP | 3-33519 A | 2/1991 |
| JP | 9-229097 A | 9/1997 |
| JP | 9-292006 A | 11/1997 |
| JP | 11-218144 A | 8/1999 |
| JP | 2000-291651 A | 10/2000 |
| WO | 96/33354 | 10/1996 |

OTHER PUBLICATIONS

EP Search Report mailed Oct. 28, 2002.

* cited by examiner

Primary Examiner—Saul Rodriguez
(74) Attorney, Agent, or Firm—Nixon & Vanderhye, P.C.

(57) ABSTRACT

A one-way clutch unit has a one-way clutch having rollers serving as engaging members and a retainer for retaining the rollers and a ball bearing axially adjacent to the one-way clutch and having balls and a retainer for retaining the balls. And in order to reduce the number of component parts and the axial length of the unit, the one-way clutch unit has a one-piece outer ring having a first outer ring part for the one-way clutch and a second outer ring part for the ball bearing, which parts are integral with each other. The one-way clutch unit also has a one-piece inner ring having a first inner ring part for the one-way clutch and a second inner ring part for the ball bearing, which parts are integral with each other.

11 Claims, 2 Drawing Sheets

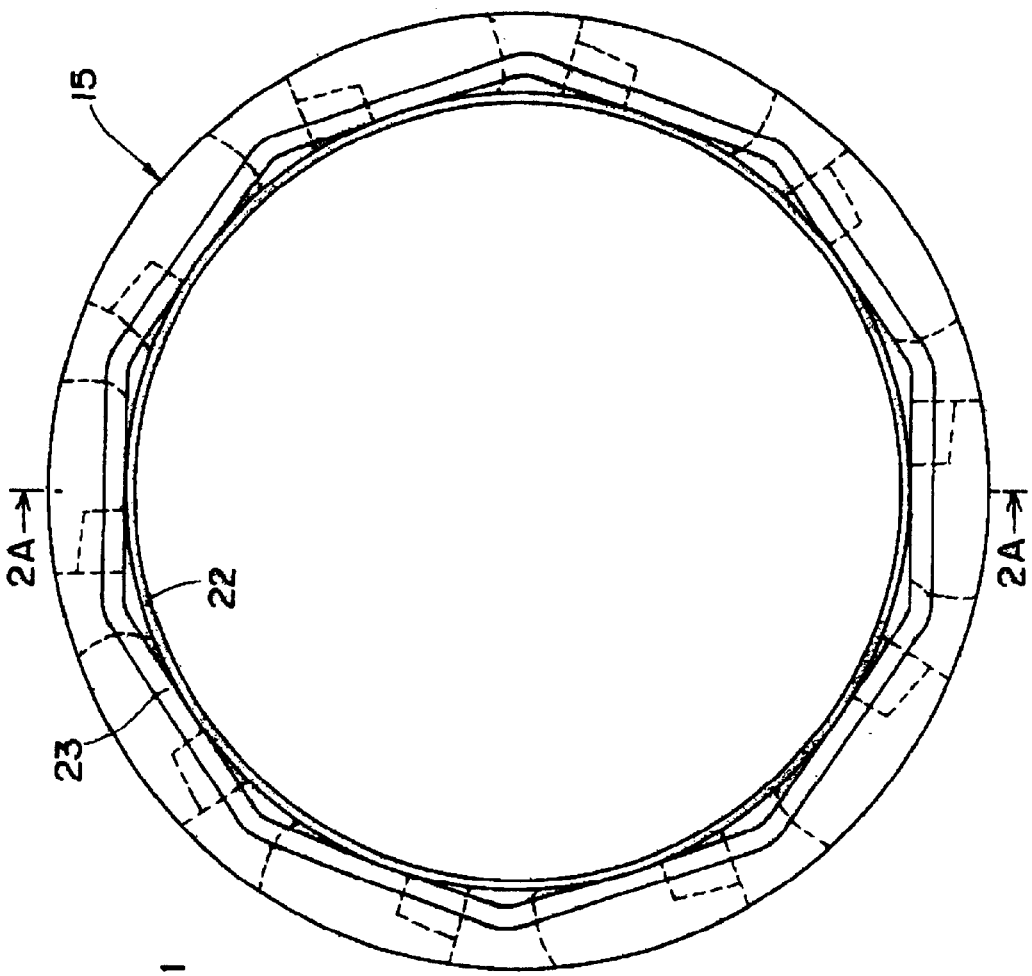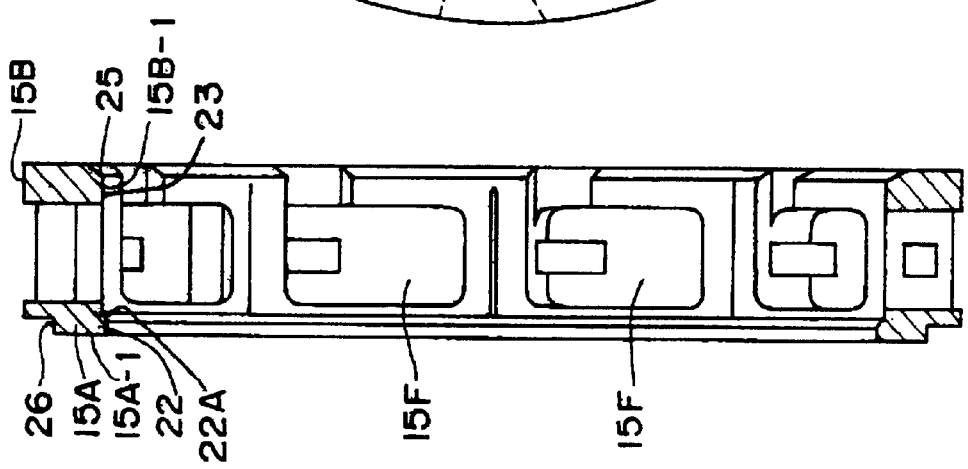

ONE-WAY CLUTCH UNIT

BACKGROUND OF THE INVENTION

The present invention relates to a one-way clutch unit including a one-way clutch having rollers serving as engaging members and a ball bearing axially adjacent to the one-way clutch.

In a conventional one-way clutch unit of this kind, a one-way clutch and a deep groove ball bearing separate from the one-way clutch are axially adjacently disposed, so that the deep groove ball bearing receives a load to secure engagement performance of the one-way clutch and its durability.

However, the conventional one-way clutch unit needs a large number of component parts owing to the provision of the separate deep groove ball bearing and has an increased axial dimension accordingly. Thus the one-way clutch unit is necessarily high in cost and large in size.

SUMMARY OF THE INVENTION

Therefore, it is an object of the present invention to provide a one-way clutch unit that allows reduction of the manufacturing cost and size by reducing the number of component parts thereof and its axial dimension.

In order to accomplish the above object, a one-way clutch unit according to the present invention comprises:

- a one-way clutch having rollers serving as engaging members and a retainer for retaining the rollers; and
- a ball bearing disposed axially adjacent to the one-way clutch and having balls and a retainer for retaining the balls, wherein:
  the one-way clutch unit comprises:
    - a one-piece outer ring having a first outer ring part for the one-way clutch and a second outer ring part for the ball bearing, both parts being integral with each other; and
    - a one-piece inner ring having a first inner ring part for the one-way clutch and a second inner ring part for the ball bearing, both parts being integral with each other.

In the one-way clutch unit, the first outer ring part for the one-way clutch is integral with the second outer ring part for the deep groove ball bearing to compose the one-piece outer ring, and the first inner ring part for the one-way clutch is integral with the second inner ring part for the deep groove ball bearing to compose the one-piece inner ring. Thus the number of component parts of the one-way clutch unit is reduced as compared with the aforementioned conventional unit. Also, it is possible to reduce an axial length of the one-way clutch unit. Therefore it is possible to reduce the cost and the size.

In one embodiment, the first outer ring part has a cylindrical inner peripheral surface, and the first inner ring part has a polygonal outer peripheral cam surface. The retainer for the ball bearing is a snap cage having an annular portion. The one-piece inner ring has a tapered surface between the polygonal outer peripheral cam surface of the first inner ring part and an outer peripheral surface of the second inner ring part, and the annular portion of the snap cage is disposed between the tapered surface of the one-piece inner ring and an inner peripheral surface of the one-piece outer ring opposed to the tapered surface.

This embodiment effectively utilizes a space between the tapered surface (present between the polygonal outer peripheral cam surface of the first inner ring part and the peripheral surface of the second inner ring part) of the one-piece inner ring and the opposite inner peripheral surface of the one-piece outer ring to dispose the annular portion of the snap cage. Thus, it is possible to prevent an increase of an axial dimension due to the provision of the snap cage.

Further since the annular portion of the snap cage is disposed on the clutch side, a space on the side opposite from the clutch increases. Therefore it is possible to facilitate or enhance circulation of grease and hence reduce the pressure of the grease. As a result, compared with a case where the annular portion is disposed not on the clutch side, but on the counter-clutch side, i.e., side opposite from the clutch, it is possible to prevent leak of the grease to a higher extent.

The tapered surface can be obtained by cold-forging the polygonal outer peripheral cam surface of the first inner ring part of the one-piece inner ring.

The retainer for the one-way clutch may have a stepped portion serving as a grease reservoir at an annular portion thereof opposite from the ball bearing.

This arrangement allows grease to be easily stored, which contributes to reduction of the pressure of the grease and prevents leak of the grease. Further it is possible to increase a grease-storing capacity and improve the life of the grease.

The one-piece outer ring may have an annular groove serving as a grease reservoir at an inner peripheral surface thereof.

This arrangement increases the grease-storing capacity. Thus an increased volume of grease can be loaded and the life of the grease can be improved.

The one-piece inner ring may have an axial length longer than that of the one-piece outer ring and a clutch-side end of the one-piece inner ring may project axially beyond a clutch-side end of the one-piece outer ring.

In a case where a rotational shaft inserted in the one-piece inner ring has a flange extending radially outwardly along the clutch-side end of the one-piece inner ring and then along the clutch-side end of the one-piece outer ring beyond the one-piece outer ring, the clutch-side end of the one-piece inner ring projecting axially beyond a clutch-side end of the one-piece outer ring prevents the flange of the rotational shaft from interfering with the axial end surface of the one-piece outer ring. Thus the assembling performance can be improved.

In one embodiment, the first inner ring part of the one-piece inner ring has an annular groove at an outer peripheral surface thereof at a side opposite from the bearing. On the other hand, the retainer for the one-way clutch has a counter-bearing-side annular portion, and the annular portion has a projection projecting radially inward. The projection is fit in the annular groove so that the retainer for the one-way clutch is axially locked to the first inner ring part.

This arrangement eliminates use of separate component parts for locking the retainer such as a snap ring. Thus it is possible to reduce the number of component parts, improve the assembling performance, and reduce the axial dimension.

In one embodiment, the first outer ring part has a cylindrical inner peripheral surface, and the first inner ring part has a polygonal outer peripheral cam surface, and the retainer for the one-way clutch has a polygonal inner peripheral surface portion that engages with the polygonal outer peripheral cam surface of the first inner ring part.

In this embodiment, fitting the polygonal inner peripheral surface portion of the retainer onto the polygonal outer peripheral cam surface of the first inner ring part achieves a function of locking the retainer against rotation. Therefore it is unnecessary to use additional component parts for that purpose and the size reduction is achievable.

The retainer for the one-way clutch may have a bearing-side annular portion and a bearing-side axial end of an inner peripheral surface of this annular portion forms a tapered surface that widens as moving axially outwardly.

The tapered surface at the axial end of the bearing-side annular portion of the retainer for the one-way clutch, which widens as it goes axially outwardly, serves as a guide surface for an outer peripheral surface (e.g. a polygonal cam surface) of the first inner ring part of the one-piece inner ring in assembling the unit. Thus the retainer can be easily mounted around the one-piece inner ring.

When the second outer ring part and second inner ring part for the ball bearing each have a raceway surface whose radius of curvature is in a range of from 50.5% to 51.5% of a diameter of the balls, the inclination of the one-piece outer ring with respect to a rotational axis decreases. As a result, the engagement performance in the one-way clutch and its durability can be improved. If the radius of curvature is less than 50.5%, the balls are so tightly engaged with the raceway surfaces that a smooth rotation of the balls is inhibited. On the other hand, if the radius of curvature is more than 51.5%, the effect of reducing the inclination of the one-piece outer ring deteriorates.

When each roller of the one-way clutch has an axial length in a range of from one to two times as large as a diameter of the roller, it is possible to restrain or minimize a difference in the distance from the outer peripheral surface of the first inner ring part to the inner peripheral surface of the first outer ring part between at both axial ends of the rollers, which would occur when the one-piece outer ring is inclined. Thus the engagement performance in the one-way clutch and its durability can be improved. If the axial length of the rollers is less than the diameter thereof, the frictional torque of the rollers becomes insufficient. On the other hand, if the axial length of the rollers is more than twice as large as the diameter thereof, the effect of restraining the above difference deteriorates.

Also, if a radial gap of the ball bearing is set to a value in a range of 0 μm to 20 μm when the one-piece outer ring is press-fitted into a housing, the inclination of the one-piece outer ring with respect to the rotational axis of the one-piece inner ring is suppressed, and the engagement performance in the one-way clutch and its durability can be improved.

In one embodiment, the one-way clutch and the ball bearing are lubricated with same grease, and one-way clutch unit has a sealing device disposed at both axial ends thereof between the one-piece outer ring and the one-piece inner ring. This arrangement simplifies the lubricating and sealing structures, which facilitates the size reduction of the one-way clutch unit.

BRIEF DESCRIPTION OF THE DRAWINGS

The present invention will become more fully understood from the detailed description given hereinbelow and the accompanying drawings which are given by way of illustration only, and thus are not limitative of the present invention, and therein:

FIG. 2A is a sectional view of a retainer for a clutch in the embodiment; and

FIG. 2B is and a plan view of the retainer.

DETAILED DESCRIPTION OF THE PREFERRED EMBODIMENTS

Figure 1:
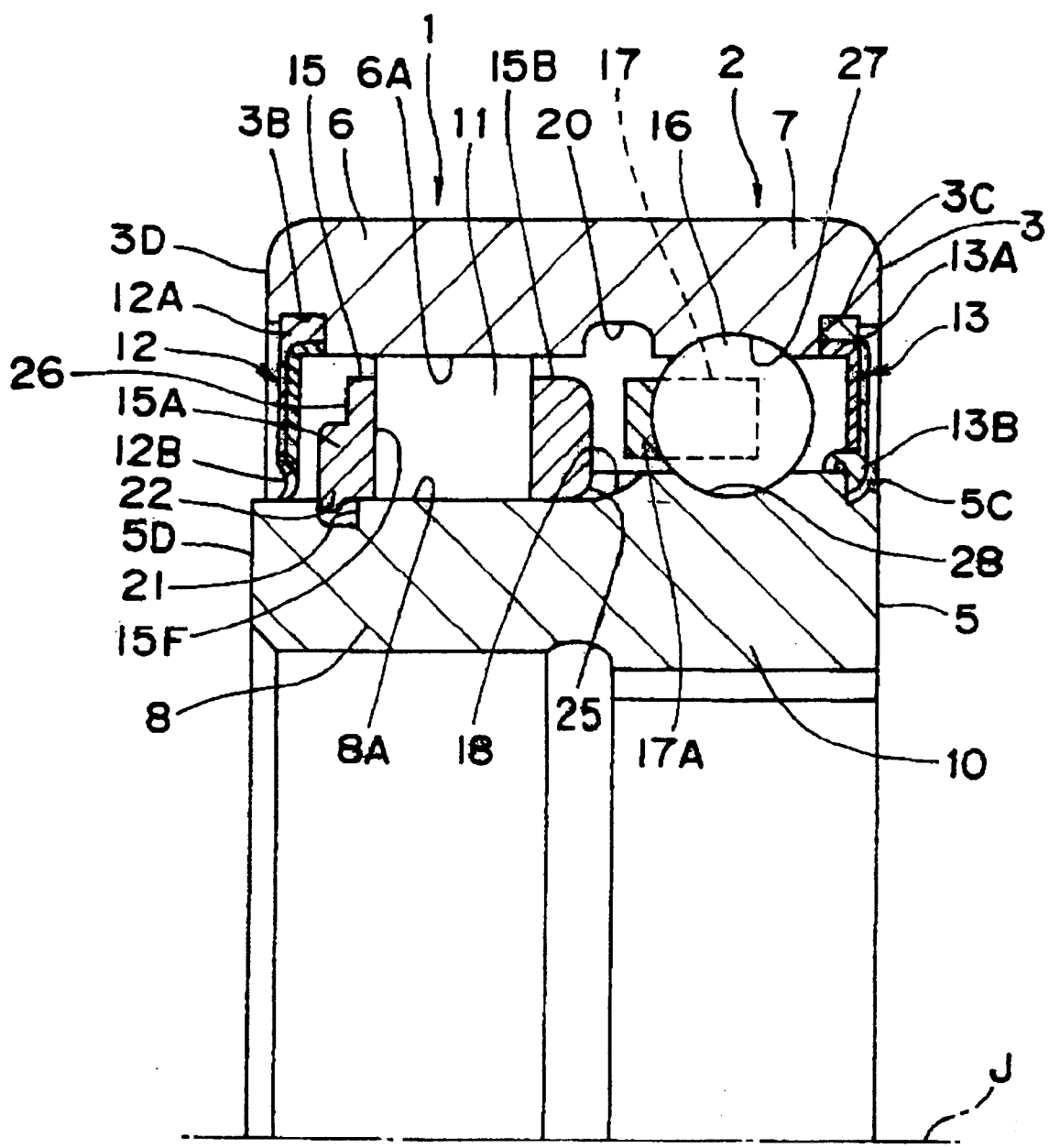
FIG. 1 is a half sectional view of an embodiment of the one-way clutch unit according to the present invention.

An embodiment of the present invention will be described below in detail with reference to the drawings.

FIG. 1 is a sectional view showing a one-way clutch unit according to an embodiment of the present invention. The one-way clutch unit has a single-row one-way clutch 1 and a single-row ball bearing 2 which are disposed axially adjacent to each other. In the embodiment, a deep grove ball bearing is used as the ball bearing 2. The one-way clutch unit of the embodiment has a one-piece outer ring 3 and a one-piece inner ring 5. The one-piece outer ring 3 has a first outer ring part 6 for the one-way clutch 1 and a second outer ring part 7 for the deep groove ball bearing 2 which are integral with each other. Also, the one-piece inner ring 5 has a first inner ring part 8 for the one-way clutch 1 and a second inner ring part 10 for the deep groove ball bearing 2 which are integral with each other.

The one-way clutch 1 has rollers 11 serving as engaging members. The first outer ring part 6 of the one-piece outer ring 3 has a cylindrical inner peripheral surface 6A. The first inner ring part 8 of the one-piece inner ring 5 has an outer peripheral cam surface 8A decagonal in cross section.

The one-way clutch 1 and the deep grove ball bearing 2 are lubricated with same grease enclosed between the one-piece outer ring 3 and the one-piece inner ring 5. Sealing devices 12 and 13 are disposed between the one-piece outer ring 3 and the one-piece inner ring 5 at both axial ends of the unit to enclose the grease. The sealing device 12A has a base portion 12A and a lip portion 12B. The base portion 12A which has a core metal is fixed to an annular stepped portion 3B formed on the inner periphery of the one-piece outer ring 3 at one axial end thereof. The lip portion 12B of the sealing device 12 is adapted to slide on the peripheral surface of the one-piece inner ring 5 at one axial end thereof. Also, the sealing device 13 has a base portion 13A and a lip portion 13B. The base portion 13A which has a core metal is fixed to an annular stepped portion 3C formed on the inner periphery of the one-piece outer ring 3 at the other axial end thereof. The lip portion 13B of the sealing device 13 is adapted to slide on a stepped portion 5C formed on the peripheral surface of the one-piece inner ring 5 at the other axial end thereof. The one-way clutch side and bearing-side sealing devices 12 and 13 can be made to have the same configuration.

The one-way clutch 1 has a retainer 15 holding the rollers 11, with the rollers 11 fitted in respective pockets 15F of the retainer 15. The deep grove ball bearing 2 has a snap cage 17 holding balls 16 serving as rolling elements.

The one-piece inner ring 5 has a tapered surface 18 between the decagonal peripheral cam surface 8A of the first inner ring part 8 and the inner peripheral surface of the second inner ring part 10. The diameter of the tapered surface 18 increases from the side of the one-way clutch 1 to the side the deep grove ball bearing 2. An annular portion 17A of the snap cage 17 is disposed on the tapered surface 18 side opposite from the sealing device 13. The one-piece outer ring 3 has an annular groove 20 formed at the inner peripheral surface thereof opposed to the tapered surface 18 of the one-piece inner ring 5. The annular groove 20 serves as a grease reservoir.

In the embodiment, the number of the rollers 11 is ten, which is equal to the number of cam surfaces constituting the sectionally decagonal peripheral cam surface 8A. The number of the balls 16 of the ball bearing 2 is 15, which is more than that of the rollers 11.

The axial length of the one-piece inner ring 5 is longer than that of the one-piece outer ring 3, and an end 5D of the one-piece inner ring 5 at the side of the one-way clutch 1 projects axially by a predetermined dimension beyond a corresponding end 3D of the one-piece outer ring 3.

The second inner ring part 10 of the one-piece inner ring 5 has its inner periphery threaded to accomplish sufficient transmission of the driving force while making the one-way clutch unit axially compact. The one-piece outer ring 3 has a thickness smaller than that of the one-piece inner ring 5, whereby the raceway diameters for the rollers 11 and the balls 16 can be increased to thereby improve the withstand load, or load capacity.

The one-piece inner ring 5 has an annular groove 21 at the outer peripheral surface of the first inner ring part 8 on a side opposite from the ball bearing. An annular portion 15A of the retainer 15 opposite from the bearing ("the counter-bearing-side retainer 15A") has a projection 22 projecting radially inward (see FIGS. 2A and 2B). By fitting the projection 22 in the annular groove 21, the retainer 15 is axially locked to the first inner ring part 8.

As shown in FIG. 2B which is a plan view seen axially from the bearing side, and in FIG. 2A which is a sectional view taken along line 2A—2A of FIG. 2B, the retainer 15 has a decagonal inner peripheral surface portion 23 that fits on the decagonal outer peripheral cam surface 8A of the first inner ring part 8. As shown in FIG. 2A, in the retainer 15, a bearing-side axial end of the inner peripheral surface 15B-1 of the annular portion 15B forms a tapered surface 25 widening as moving radially outwardly.

The projection 22 formed radially inside of the counter-bearing-side annular portion 15A of the retainer 15 has an axially inside surface that defines a tapered surface 22A, which has an increasing diameter as moving axially inwardly. Owing to the presence of the tapered surface 22A, the retainer 15 can be inserted easily axially along the peripheral cam surface 8A of the first inner ring part 8 of the one-piece inner ring 5. Thus the retainer 15 can be easily mounted on the one-piece inner ring 5.

As shown in FIG. 2A a stepped portion 26 is formed at the peripheral edge of a radially outward end surface 15A-1 of the counter-bearing-side annular portion 15A. As shown in FIG. 1, the stepped portion 26 serves to store the grease between the stepped portion 26 and the sealing device 12.

In the embodiment, the radius of curvature of a raceway surface 27 of the second outer ring part 7 for the deep groove ball bearing 2 and that of a raceway surface 28 of the second inner ring part 10 therefor are set to values in the range of 50.5% to 51.5% of the diameter of the balls 16 respectively. Also, the axial length of the rollers 11 of the one-way clutch 1 is set to a value in a range of from one to two times as large as a diameter of the rollers 11.

In the embodiment, the radial gap of the deep groove ball bearing 2 is set to a value in a range of from 0 $\mu$m to 20 $\mu$m when the one-piece outer ring 3 is press-fitted in a bore of a housing (not shown) in which the one-way clutch unit is incorporated.

According to the one-way clutch unit of the embodiment, the first outer ring part 6 for the one-way clutch 1 and the second outer ring part 7 for the deep groove ball bearing 2 are united or integrated into the one-piece outer ring 3. Similarly, the first inner ring part 8 for the one-way clutch 1 and the second inner ring part 10 for the deep groove ball bearing 2 are integrated into the one-piece inner ring 5. Thus it is possible to reduce the number of component parts and shorten the axial length of the one-way clutch unit. Therefore it is possible to reduce the cost and make the unit compact.

According to the embodiment, the annular portion 17A of the snap cage 17 is disposed in a space between the tapered surface 18 (which is present between the decagonal outer peripheral cam surface 8A of the first inner ring part 8 and the peripheral surface of the second inner ring part 10) and the opposite inner peripheral surface of the one-piece outer ring 3. Such effective utilization of a space prevents an increase of an axial dimension that would be otherwise caused by the provision of the snap cage 17. In other words, it is possible to reduce the axial dimension. Further since the annular portion 17A of the snap cage 17 is disposed on the clutch side, a space on the sealing device 13 side increases. Therefore it is possible to enhance circulation of the grease and hence reduce the pressure of the grease. As a result, compared with a case where the annular portion 17A is disposed on the sealing device 13 side, it is possible to prevent leak of the grease to a higher extent.

The tapered surface 18 can be formed by preparing the decagonal outer peripheral cam surface 8A of the first inner ring part 8 of the one-piece inner ring 5 by cold forging.

According to the embodiment, because the stepped portion 26 serving as the grease reservoir is formed on the counter-bearing-side annular portion 15A of the retainer 15, storage of grease is facilitated. Thus the pressure of the grease is reduced so that leak of the grease is prevented. Further it is possible to increase a grease-storing capacity and improve the grease life.

Further, according to the embodiment, because the annular groove 20 serving as the grease reservoir is also formed at the inner peripheral surface of the one-piece outer ring 3, the grease-storing capacity is increased. Thus an increased volume of grease can be loaded and the life of the grease can be improved. Because the annular portion 20 is formed in a region confronting the tapered surface 18, a grease reservoir is provided with good space utilization efficiency.

Further, according to the embodiment, the axial length of the one-piece inner ring 5 is longer than that of the one-piece outer ring 3 and at the same time the end 5D of the one-piece inner ring 5 at the side of the one-way clutch 1 projects axially by a predetermined dimension beyond the corresponding end 3D of the one-piece outer ring 3. Thus, in a case, for example, where a rotational shaft inserted in a bore of the one-piece inner ring 5 has a flange extending radially outwardly along the clutch-side end 5D of the one-piece inner ring 5 and then along the clutch-side end 3D of the one-piece outer ring 3 beyond the one-piece outer ring 3, such a flange portion can be prevented from interfering with the axial end surface 3D of the one-piece outer ring 3. Thereby the assembling performance can be improved.

Also, according to the embodiment, by fitting the radially inwardly protruding projection 22 of the counter-bearing-side annular portion 15A of the retainer 15 in the annular groove 21 formed at the outer peripheral surface of the first inner ring part 8 of the one-piece inner ring 5, the retainer 15 for the one-way clutch is axially locked to the one-piece inner ring 5. This eliminates use of separate component parts for locking the retainer such as a snap ring. Thus it is possible to reduce the number of component parts, improve the assembling performance, and reduce the axial dimension of the unit.

According to the embodiment, the retainer 15 for the clutch has the decagonal inner peripheral surface portion 23. Fitting the decagonal inner peripheral surface portion 23 onto the decagonal outer peripheral cam surface 8A of the first inner ring part 8 achieves the function of locking the retainer 15 against rotation. Therefore it is unnecessary to use additional component parts for that purpose, which makes it possible to make the unit compact.

Further, according to the embodiment, when the retainer 15 for the one-way clutch is inserted axially from the end 5D of the one-piece inner ring 5 during assembly, the tapered surface 25 at the bearing-side axial end of the retainer 15, which widens as it goes axially outwardly, serves as a guide surface for guiding the retainer 15 along the decagonal peripheral cam surface 8A of the first inner ring part 8 of the one-piece inner ring 5. Thus the retainer 15 can be easily mounted around the one-piece inner ring 5.

In addition, according to the one-way clutch unit of the embodiment, because the radii of curvature of the raceway surface 27 of the second outer ring part 7 and of the raceway surface 28 of the second inner ring part 10 for the deep groove ball bearing 2 are each set to a value in the range of 50.5% to 51.5% of the diameter of the ball 16, reduction in the inclination of the one-piece outer ring 3 with respect to the rotational axis J is accomplished, and the engagement performance in the one-way clutch 1 and its durability can be improved. Further because the axial length of the rollers 11 of the one-way clutch 1 is set to a value in a range of from one to two times as large as the diameter of the rollers, it is possible to restrain a difference in the distance of the inner peripheral surface 6A of the first outer ring part 6 from the outer peripheral cam surface 8A of the first inner ring part 8 between at both axial ends of the rollers 11, which would occur when the one-piece outer ring is inclined. Thus the engagement performance in the one-way clutch 1 and its durability can be improved.

Further, according to the embodiment, because the radial gap of the deep groove ball bearing 2 when the one-piece outer ring 3 is press-fitted in an unshown housing is set to a value in the range of 0 μm to 20 μm, inclination of the one-piece outer ring 3 with respect to the rotational axis J of the one-piece inner ring 5 is suppressed. Thus, the engagement performance and durability of the one-way are improved.

In the embodiment, the peripheral surface of the first inner ring part 8 of the one-piece inner ring 5 is decagonal. Alternatively, the peripheral surface thereof may have a shape of a polygon other than a decagon. In this case, the inner peripheral surface portion 23 of the retainer 15 for the clutch is formed in a polygonal shape corresponding to the polygonal shape of the peripheral surface of the first inner ring part 8.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A one-way clutch unit comprising:
   a one-way clutch having rollers serving as engaging members and a retainer for retaining the rollers; and
   a ball bearing disposed axially adjacent to the one-way clutch and having balls and a retainer for retaining the balls;
   a one-piece outer ring having a first outer ring part for the one-way clutch and a second outer ring part for the ball bearing, both parts being integral with each other; and
   a one-piece inner ring having a first inner ring part for the one-way clutch and a second inner ring part for the ball bearing, both parts being integral with each other;
   wherein the first outer ring part has a cylindrical inner peripheral surface, and the first inner ring part has a polygonal outer peripheral cam surface;
   wherein the retainer for the ball bearing is a snap cage having an annular portion;
   wherein the one-piece inner ring has a tapered surface between the polygonal outer peripheral cam surface of the first inner ring part and an outer peripheral surface of the second inner ring part; and
   wherein the annular portion of the snap cage is disposed between the tapered surface of the one-piece inner ring and an inner peripheral surface of the one-piece outer ring opposed to the tapered surface.

2. A one-way clutch unit comprising:
   a one-way clutch having rollers serving as engaging members and a retainer for retaining the rollers; and
   a ball bearing disposed axially adjacent to the one-way clutch and having balls and a retainer for retaining the balls;
   a one-piece outer ring having a first outer ring part for the one-way clutch and a second outer ring part for the ball bearing, both parts being integral with each other; and
   a one-piece inner ring having a first inner ring part for the one-way clutch and a second inner ring part for the ball bearing, both parts being integral with each other;
   wherein the retainer for the one-way clutch has a stepped portion serving as a grease reservoir at an annular portion thereof opposite from the ball bearing.

3. A one-way clutch unit comprising:
   a one-way clutch having rollers serving as engaging members and a retainer for retaining the rollers; and
   a ball bearing disposed axially adjacent to the one-way clutch and having balls and a retainer for retaining the balls;
   a one-piece outer ring having a first outer ring part for the one-way clutch and a second outer ring part for the ball bearing, both parts being integral with each other; and
   a one-piece inner ring having a first inner ring part for the one-way clutch and a second inner ring part for the ball bearing, both parts being integral with each other;
   wherein the one-piece outer ring has an annular groove serving as a grease reservoir at an inner peripheral surface thereof.

4. A one-way clutch unit comprising:
   a one-way clutch having rollers serving as engaging members and a retainer for retaining the rollers; and
   a ball bearing disposed axially adjacent to the one-way clutch and having balls and a retainer for retaining the balls;
   a one-piece outer ring having a first outer ring part for the one-way clutch and a second outer ring part for the ball bearing, both parts being integral with each other; and
   a one-piece inner ring having a first inner ring part for the one-way clutch and a second inner ring part for the ball bearing, both parts being integral with each other;
   wherein the one-piece inner ring has an axial length longer than that of the one-piece outer ring and a clutch-side end of the one-piece inner ring projects axially beyond a clutch-side end of the one-piece outer ring.

5. A one-way clutch unit comprising:
   a one-way clutch having rollers serving as engaging members and a retainer for retaining the rollers; and
   a ball bearing disposed axially adjacent to the one-way clutch and having balls and a retainer for retaining the balls;
   a one-piece outer ring having a first outer ring part for the one-way clutch and a second outer ring part for the ball bearing, both parts being integral with each other; and a one-piece inner ring having a first inner ring part for the one-way clutch and a second inner ring part for the ball bearing, both parts being integral with each other;

wherein the first inner ring part of the one-piece inner ring has an annular groove at an outer peripheral surface thereof on a side opposite from the bearing;

wherein the retainer for the one-way clutch has a counter-bearing-side annular portion, and the annular portion has a projection projecting radially inward; and wherein the projection is fit in the annular groove so that the retainer for the one-way clutch is axially locked to the first inner ring part.

6. A one-way clutch unit comprising:

a one-way clutch having rollers serving as engaging members and a retainer for retaining the rollers; and a ball bearing disposed axially adjacent to the one-way clutch and having balls and a retainer for retaining the balls;

a one-piece outer ring having a first outer ring part for the one-way clutch and a second outer ring part for the ball bearing, both parts being integral with each other; and a one-piece inner ring having a first inner ring part for the one-way clutch and a second inner ring part for the ball bearing, both parts being integral with each other;

wherein the first outer ring part has a cylindrical inner peripheral surface, and the first inner ring part has a polygonal outer peripheral cam surface; and wherein the retainer for the one-way clutch has a polygonal inner peripheral surface portion that engages with the polygonal outer peripheral cam surface of the first inner ring part.

7. A one-way clutch unit comprising:

a one-way clutch having rollers serving as engaging members and a retainer for retaining the rollers; and a ball bearing disposed axially adjacent to the one-way clutch and having balls and a retainer for retaining the balls;

a one-piece outer ring having a first outer ring part for the one-way clutch and a second outer ring part for the ball bearing, both parts being integral with each other; and a one-piece inner ring having a first inner ring part for the one-way clutch and a second inner ring part for the ball bearing, both parts being integral with each other;

wherein the retainer for the one-way clutch has a bearing-side annular portion and a bearing-side axial end of an inner peripheral surface of this annular portion forms a tapered surface that widens as moving axially outwardly.

8. A one-way clutch unit comprising:

a one-way clutch having rollers serving as engaging members and a retainer for retaining the rollers; and a ball bearing disposed axially adjacent to the one-way clutch and having balls and a retainer for retaining the balls;

a one-piece outer ring having a first outer ring part for the one-way clutch and a second outer ring part for the ball bearing, both parts being integral with each other; and a one-piece inner ring having a first inner ring part for the one-way clutch and a second inner ring part for the ball bearing, both parts being integral with each other;

wherein the second outer ring part and second inner ring part for the ball bearing each have a raceway surface whose radius of curvature is in a range of from 50.5% to 51.5% of a diameter of the balls.

9. A one-way clutch unit comprising:

a one-way clutch having rollers serving as engaging members and a retainer for retaining the rollers; and a ball bearing disposed axially adjacent to the one-way clutch and having balls and a retainer for retaining the balls;

a one-piece outer ring having a first outer ring part for the one-way clutch and a second outer ring part for the ball bearing, both parts being integral with each other; and a one-piece inner ring having a first inner ring part for the one-way clutch and a second inner ring part for the ball bearing, both parts being integral with each other;

wherein each roller of the one-way clutch has an axial length in a range of from one to two times as large as a diameter of the roller.

10. A one-way clutch unit comprising:

a one-way clutch having rollers serving as engaging members and a retainer for retaining the rollers; and a ball bearing disposed axially adjacent to the one-way clutch and having balls and a retainer for retaining the balls;

a one-piece outer ring having a first outer ring part for the one-way clutch and a second outer ring part for the ball bearing, both parts being integral with each other; and a one-piece inner ring having a first inner ring part for the one-way clutch and a second inner ring part for the ball bearing, both parts being integral with each other;

wherein a radial gap of the ball bearing is set to a value in a range of 0 $\mu$m to 20 $\mu$m when the one-piece outer ring is press-fitted in a housing.

11. A one-way clutch unit comprising:

a one-way clutch having rollers serving as engaging members and a retainer for retaining the rollers; and a ball bearing disposed axially adjacent to the one-way clutch and having balls and a retainer for retaining the balls;

a one-piece outer ring having a first outer ring part for the one-way clutch and a second outer ring part for the ball bearing, both parts being integral with each other; and a one-piece inner ring having a first inner ring part for the one-way clutch and a second inner ring part for the ball bearing, both parts being integral with each other;

wherein the one-way clutch and the ball bearing are lubricated with same grease, and one-way clutch unit has a sealing device disposed at both axial ends thereof between the one-piece outer ring and the one-piece inner ring.

* * * * *